July 17, 1934.  R. R. CHAPPELL ET AL  1,966,847
JEWEL BEARING AND MOUNTING THEREFOR
Filed Oct. 10, 1931
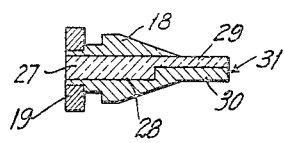
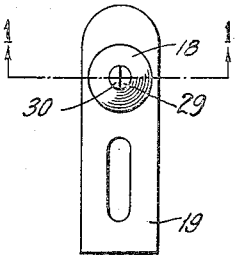
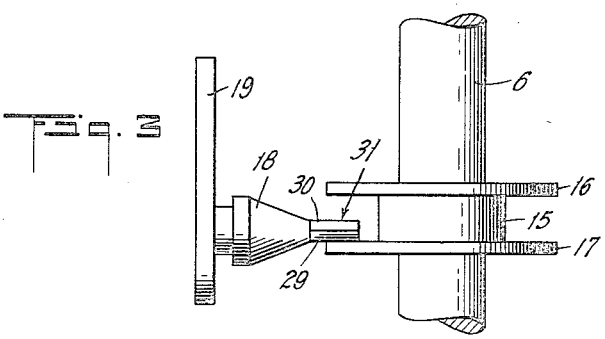
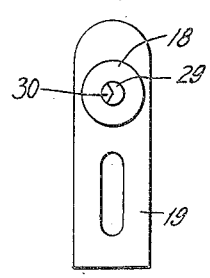
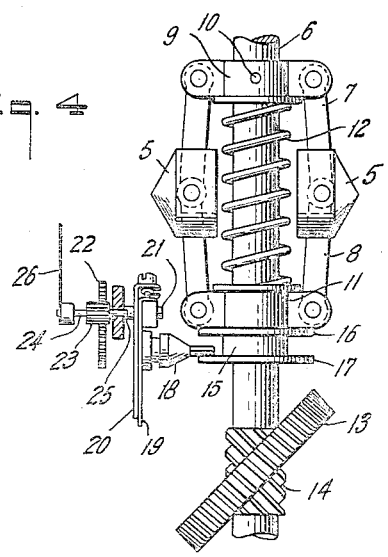
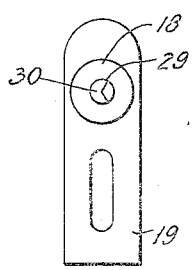
INVENTORS:
Ralph R. Chappell
Robert J. Streb
BY Stephen Cerstvik
ATTORNEY.

Patented July 17, 1934

1,966,847

UNITED STATES PATENT OFFICE 1,966,847

JEWEL BEARING AND MOUNTING THEREFOR

Ralph R. Chappell, Richmond, Va., and Robert J. Streb, Baltimore, Md., assignors to Bendix Aviation Corporation, East Orange, N. J., a corporation of Delaware Application October 10, 1931, Serial No. 568,136

20 Claims. (Cl. 308—2)

The present invention relates to bearings and more particularly to jewel bearings of the type adapted to be employed in mechanisms for transmitting forces due to rotation and for translating such forces into other motions, and in which the jewel element projects from a member at right angles to the plane of motion of said member and is constantly in contact with an element rotating at relatively high speeds.

Heretofore, in providing jewel bearings of the above type, it has been customary to make a jewel element merely in the form of a pin secured to and projecting from the member arranged to be actuated by the rotating element, but it has been found that because of the brittle character of the hard jewels employed, the pin generally broke off after a relatively short period of use due to impact and to transverse or cantilever forces acting against the jewelpin.

Therefore, one of the objects of the present invention is to provide a novel construction of a jewel element and a novel mounting therefor, whereby the foregoing difficulties are eliminated and the life of the jewel is greatly increased, thereby rendering the bearing particularly suitable for use in aircraft speed indicators and tachometers of the Porter type, wherein a centrifugal governor is employed for actuating a suitable pointer to indicate speed.

Another object of the invention is to provide a novel and improved construction of a jewel bearing and a mounting therefor which is reliable in operation, involves a minimum number of parts, and which is relatively inexpensive to manufacture.

Still another object is the provision of a novel support or reinforcing mounting for a jewel bearing which may be moulded or cast to the exact dimensions required, and thus obviate expensive and unnecessary machine work.

The above and other objects and advantages of the invention will appear more fully hereinafter from a consideration of the detailed description which follows, together with the accompanying drawing, wherein is illustrated one form of the bearing embodying the invention and its application to a practical device. It is to be expressly understood, however, that the drawing is merely for the purpose of illustration and description, and is not designed as a definition of the limits of the invention, reference being had for this purpose to the appended claims.

In the drawing, wherein like reference characters refer to like parts throughout the several views, Fig. 1 is a sectional view taken on line 1—1 of Fig. 2, of one form of the novel bearing embodying the present invention;

Fig. 2 is a front elevation thereof, illustrating the sector-like portion of the jewel element which is exposed;

Fig. 3 is an enlarged side elevation illustrating one application of the invention;

Fig. 4 is another side elevation showing a portion of a centrifugal tachometer in which the bearing is employed as part of the transmission mechanism for actuating a pointer; and Figs. 5 and 6 are views similar to Fig. 2, illustrating a greater and lesser exposed portion, respectively, of the jewel element.

Referring to the drawing in detail, and more particularly to Fig. 4, the bearing is shown incorporated in a centrifugal tachometer or speed indicator of the type disclosed in our copending application, Serial No. 525,246, filed March 25, 1931, for Means for indicating angular motion. It is to be understood, however, that the bearing may be used in other types of machines or mechanisms, and as the indicator forms no part of the present invention, it will be described in only such detail as to show the connection of the invention therewith.

The tachometer machinism, in the form shown, is constituted by a plurality of weights 5, arranged circumferentially about a shaft or spindle 6, and each of which is pivotally mounted on arms 7 and 8, the arms 7, in turn being pivotally secured to a collar 9 which is fixed to and rotatable with the shaft or spindle 6 by means of a pin 10 passing through the shaft and pressed in the collar, that is, the collar 9 is permanently secured to the shaft or spindle 6. The arms 8 are also pivotally secured to another collar 11, which, however, is not secured to the shaft but is rotatable with and movable longitudinally along the length thereof by the action of the weights 5 which are caused to fly out when the shaft 6 is rotated. A coil spring 12 which surrounds the shaft 6 is interposed between the collars 9 and 11 so that the collar 11 is moved against the compression of the spring 12 when the weights 5 are caused to fly out and by means of which the collar 11 is returned to normal position, when the rotation of the shaft ceases.

The shaft 6 may be suitably journaled in bearings provided in the tachometer casing (not shown).

The rotation of the shaft 6 is produced by a pinion 13 which may be drivably connected to a flexible shaft (not shown) and which meshes with a gear 14 secured to or formed integral with the shaft.

Means are provided for employing the axial motion of the collar 11 along the shaft 6 to actuate a pointer, said means comprising a transmission mechanism which includes a sleeve member 15 having an annular groove formed by circumferential flanges 16 and 17, said sleeve member being secured to or formed integral with the collar 11 so that said sleeve is movable along the shaft with the collar when the latter is actuated.

A frusto-conical member 18, from which the jewel element is arranged to project into the annular groove and which forms a part of the novel bearing of the present invention, is mounted upon an adjustable lever 20, the former being secured to a stub shaft 21 journaled in suitable bearings (not shown).

The stub shaft 21 has mounted thereon a gear sector 22 which is arranged to mesh with a pinion 23 carried by a counter shaft 24 which is journaled as indicated at 25. The shaft 24 has secured thereto a pointer 26, which is arranged to traverse a suitable marked scale or dial (not shown).

It will be apparent from this arrangement, that, as the sleeve member 15 is moved along the shaft 6 against the compression of the spring 12 by the action of the centrifugal weights 5, the flange 17 will bear against the jewel bearing, thereby causing the bracket 19 and lever 20 to rock about the axis of the shaft 21, causing the latter to also rock in its bearings. Rocking of the shaft 21 imparts motion to the gear sector 22, thereby causing the latter to actuate the pointer 26 through the pinion 23 of shaft 24. Any suitable means such, for example, as a hair spring (not shown) may be provided for returning the pointer 26 to zero position when the governor shaft 6 ceases to rotate.

It will also be seen from the foregoing, that the jewel element which projects from the member 18 in the form of a pin into the annular groove formed by the flanges 16 and 17 is constantly in contact with the latter flange, which is rotating at relatively high speeds, and is subjected to transverse or cantilever forces by said flange, thereby tending to shear the jewel element from its support. In order to prevent such shearing of the jewel element, the novel construction of the present invention is provided. This latter construction is more clearly illustrated in Figs. 1, 2, and 3.

Referring now to Fig. 1, the novel bearing of the invention comprises a jewel element 27, preferably of agate, synthetic ruby, or other suitable hard material, and is substantially cylindrical through a portion of its length, as indicated at 28, and semi-cylindrical for the remainder of its length, as indicated at 29; that is, the cross-section of the latter portion may be semi-circular, or as indicated in Figs. 5 and 6, the cross-section may be sector-like, the sector being greater or less than 180 degrees.

Around a major portion of the jewel element is moulded or cast a support or reinforcing mounting of metal, if cast; or of hard rubber, or of a hard phenolic condensation product, if moulded.

The support of mounting which has been indicated as 18 in the previous figures, preferably is of frusto-conical form so as to provide sufficient material around the jewel element at the place where the greatest amount of strain is applied to the bearing to prevent breaking of said jewel element.

The support 18 is so moulded or cast around the jewel element that it has a projection 30 extending from the frusto-conical portion and which is also semi-cylindrical so that together with the semi-cylindrical portion 29 of the jewel element, it forms a cylindrical surface, which constitutes the main bearing surface of the bearing in the form of a pin 31, or the projection 30 may have the sector-like cross-sectional form shown in Figures 5 and 6 to form the pin 31 together with the jewel element.

The bearing may be made in other ways than moulding or casting, if desired, as for example, by making the mounting of suitable metal independently of the jewel element and forming it to the desired shape so that the projection 30 is semi-cylindrical or of sector-like cross-section, as desired, and boring a passage through the frusto-conical portion to provide for the insertion of the jewel element therein, so that the semi-cylindrical or sector-like portion 29 of the jewel has its flattened side or adjacent sides coinciding with the flattened side or adjacent sides of the projection 30 to form the pin 31, and securing the jewel element in its mounting or support by some suitable adhesive material, such as jeweler's cement.

In the latter construction, the jewel element and its mounting are formed separately and the former is inserted into and combined with the latter in the manner described. The bearing is then secured to the bracket 19 and when employed with the centrifugal tachometer shown in Figure 4, so mounted that the jewel portion 29 of the pin 31 comes in contact with the element rotating at high speed, as for example, the flange 17, and thus the projection 30 of the mounting forms a reinforcing backing for the jewel element, thereby preventing breaking or shearing of the latter due to the transverse forces applied to it by the rotating element.

There is thus provided a novel jewel bearing and a mounting therefor which is durable and not subject to breakage, relatively simple to produce and therefore inexpensive to manufacture, and one which is particularly adapted for use in instruments which are subjected to extremely hard use, as for example, aircraft instruments.

While only one form of jewel and mounting has been illustrated, other changes in the form and construction and relative arrangement of the parts, which will now be apparent to those skilled in the art, may be made without departing from the scope of the invention. Reference is therefore to be made to the appended claims for a definition of the limits of the invention.

What is claimed is:

1. A bearing comprising in combination a support, an elongated bearing element arranged to project from said support, and means formed integral with said support and extending the full length of said bearing element on one side thereof to provide a reinforcing backing for said bearing element longitudinally thereof to prevent said element from breaking transversely.

2. A bearing comprising a bearing element of relatively hard material and a support arranged around said element so that a portion of the latter projects from said support and is reinforced by a corresponding projection of said support throughout the entire length of said element on one side thereof.

3. A bearing comprising a bearing element of relatively hard material, and a support or mounting of different material arranged around said element so as to completely surround a major portion thereof and to expose a portion of substantial length and whose cross-section is sector-like combining with a sector like portion of the support to form a bearing pin.

4. In combination, a bearing element constituted by a jewel, and a supporting member completely surrounding the major portion of the jewel and having a removed portion to expose a portion of substantial length of said jewel and having a sector-like cross-section combining with a sector like portion of the support to form a bearing pin.

5. A bearing, including, in combination, a member comprising a combined support and mounting for a bearing element, and a bearing element of relatively hard material carried by and partly projecting from said support, the latter also having a projection serving as a reinforcing backing for the bearing element longitudinally thereof to prevent said element from breaking transversely, said projection combining with the projecting portion of said element to form a bearing pin.

6. A bearing including, in combination, a member comprising a combined support and mounting for a bearing element, and a non-metallic bearing element of relatively hard material carried by and partly exposed from said support, the latter having a projection serving as a reinforcing backing for the bearing element longitudinally thereof to prevent said element from breaking transversely, said projection combining with the exposed portion of said element to form a bearing pin.

7. A bearing, including, in combination, a member comprising a combined support and mounting for a jewel element, and a jewel element carried by and partly exposed from said support, the latter having a projection serving as a reinforcing backing for the jewel element longitudinally thereof to prevent said element from breaking transversely, said projection combining with the exposed portion of said jewel element to form a bearing pin.

8. A bearing comprising, in combination, a bearing element of relatively hard material which is substantially cylindrical through a portion of its length and having a sector-like cross-section for the remainder of its length, and a mounting for said bearing element having a projection of also substantially sector-like cross-section and cooperating with the sector-like portion of the bearing element to form a cylindrical bearing pin.

9. A bearing comprising, in combination, a jewel element which is substantially cylindrical through a portion of its length and having a sector-like cross-section for the remainder of its length, and a mounting for said jewel element having a projection of also substantially sector-like cross-section and cooperating with the sector-like portion of the jewel element to form a cylindrical bearing pin.

10. A bearing comprising, in combination, a jewel element having a substantially circular cross-section through a portion of its length and a semi-circular cross-section for the remainder of its length, and a mounting for said jewel element having a projection of substantially semi-circular cross-section and cooperating with the semi-circular portion of the jewel element to from a cylindrical bearing pin.

11. A bearing of the class described comprising, in combination, a bearing element which is substantially cylindrical through a portion of its length and flattened on one side for the remainder of its length, and a reinforcing mounting element cooperating with the bearing element to form a substantially cylindrical bearing pin together with the flattened portion of the bearing element.

12. A bearing of the class described comprising, in combination, a non-metallic bearing element which is substantially cylindrical through a portion of its length and flattened on one side for the remainder of its length, and a reinforcing mounting element cooperating with the non-metallic bearing element to form a substantially cylindrical bearing pin together with the flattened portion of the non-metallic bearing element.

13. A bearing of the class described comprising in combination, a bearing element which is substantially cylindrical through a portion of its length and flattened on one side for the remainder of its length, and a reinforcing mounting element of different material than the bearing element and cooperating with the bearing element to form a substantially cylindrical bearing pin together with the flattened portion of the bearing element.

14. A bearing of the class described comprising in combination, a jewel element which is substantially cylindrical through a portion of its length and flattened on one side for the remainder of its length, and a reinforcing mounting element cooperating with the jewel element to form a substantially cylindrical bearing pin together with the flattened portion of the jewel element.

15. A bearing of the class described comprising in combination, a jewel element which is substantially cylindrical through a portion of its length and flattened on one side for the remainder of its length, and a metallic reinforcing element cooperating with the jewel element to form a substantially cylindrical bearing pin together with the flattened portion of the jewel element.

16. A bearing and mounting therefore comprising in combination, a bracket, a bearing element which is cylindrical through a portion of its length and semi-cylindrical for the remainder of its length, and a supporting and reinforcing member for said bearing element and carried by said bracket, said supporting member projecting from and at an angle to the bracket and having a bore accommodating the cylindrical portion of the bearing element, and also having a semi-cylindrical portion extending beyond the bore and cooperating with the semi-cylindrical portion of the bearing element to form a substantially cylindrical bearing pin.

17. A bearing and mounting therefor, comprising in combination, a bracket, a jewel element which is cylindrical through a portion of its length and a semi-cylindrical for the remainder of its length, and a supporting and reinforcing member for said jewel element and carried by said bracket, said supporting member projecting from and at an angle to the bracket and having a bore for accommodating the cylindrical portion of the jewel element, and also having a semi-cylindrical portion extending beyond the bore and cooperating with the semi-cylindrical portion of the jewel element to form a substantially cylindrical bearing pin.

18. A bearing and mounting therefor, comprising in combination, a bracket, a jewel element which is cylindrical through a portion of its length and semi-cylindrical for the remainder of its length, and a supporting and reinforcing member of different material for said jewel element and carried by said bracket, said supporting member projecting from and at an angle to the bracket and having a bore for accommodating the cylindrical portion of the jewel element, and also having a semi-cylindrical portion extending beyond the bore and cooperating with the semi-cylindrical portion of the jewel element to form a substantially cylindrical bearing pin.

19. A bearing and mounting therefor, comprising in combination, a bracket, a jewel element which is cylindrical through half its length and semi-cylindrical for the other half of its length and a supporting and reinforcing member for said jewel element, and carried by said bracket, said supporting member projecting from and at an angle to the bracket and having a bore for accommodating the cylindrical portion of the jewel element and also having a semi-cylindrical portion extending beyond the bore and cooperating with the semi-cylindrical portion of the jewel element to form a substantially cylindrical bearing pin.

20. A bearing and mounting therefor, comprising in combination, a bracket, a jewel element having a circular cross-section through a portion of its length and a sector-like cross-section for the remainder of its length, and a supporting and reinforcing member for said jewel element and carried by said bracket, said supporting member projecting from and at an angle to the bracket and having a bore for accommodating the circular cross-sectional portion of the jewel element and also having a portion of sector-like cross-section extending beyond the bore and cooperating with the sector-like portion of the jewel element to form a substantially cylindrical bearing pin.

RALPH R. CHAPPELL.
ROBERT J. STREB.